(12) United States Patent
Farrell et al.

(10) Patent No.: US 10,963,239 B2
(45) Date of Patent: Mar. 30, 2021

(54) OPERATIONAL FILE MANAGEMENT AND STORAGE

(71) Applicant: International Business Machines Corporation, Armonk, NY (US)

(72) Inventors: Leo M. Farrell, Queensland (AU); Scott Exton, Ormeau Hills (AU); Anthony B. Ferguson, Ashmore Gold Coast (AU)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 16 days.

(21) Appl. No.: 16/164,571

(22) Filed: Oct. 18, 2018

(65) Prior Publication Data
US 2020/0125350 A1 Apr. 23, 2020

(51) Int. Cl.
*G06F 9/445* (2018.01)
*G06F 8/65* (2018.01)
(Continued)

(52) U.S. Cl.
CPC .......... *G06F 8/65* (2013.01); *G06F 8/61* (2013.01); *G06F 11/1433* (2013.01); *G06F 21/602* (2013.01); *G06F 2201/84* (2013.01)

(58) Field of Classification Search
CPC .......... G06F 16/219; G06F 16/1756; G06F 11/1469; G06F 11/1451; G06F 8/65; G06F 8/61; G06F 8/658; G06F 8/71; G06F 8/41; G06F 16/1844; G06F 16/27; G06F 11/1433; G06F 8/654; G06F 8/70; G06F 16/10; G06F 16/182; G06F 16/162; G06F 16/137; G06F 8/4434; G06F 21/602; G06F 2201/84; G06F 8/60; Y10S 707/88854; Y10S 707/99953; Y10S 707/99954; H04L 67/1095; H04L 67/34; H04L 67/2823; H04L 67/10; H04L 69/329

See application file for complete search history.

(56) References Cited

U.S. PATENT DOCUMENTS 6,049,663 A * 4/2000 Harikrishnan ............ G06F 8/62
703/23
8,468,515 B2 6/2013 Chen
(Continued)

OTHER PUBLICATIONS

Samteladze et al., Delta++: Reducing the Size of Android Application Updates, 8 pages (Year: 2014).*
(Continued)

*Primary Examiner* — Thuy Dao
(74) *Attorney, Agent, or Firm* — Fabian VanCott; Steven L. Nichols

(57) ABSTRACT

According to a computer-implemented method, an update package that includes update operational files is received at a computing device. At least one update operational file is to replace a corresponding original operational file for the computing device. It is determined which of the original operational files are to be replaced with corresponding update operational files. A delta file is stored at the computing device, which delta file indicates the original operational files that are replaced with corresponding update operational files and the update package is installed at the computing device.

20 Claims, 5 Drawing Sheets

(51) Int. Cl.
*G06F 8/71* (2018.01)
*G06F 11/07* (2006.01)
*G06F 8/658* (2018.01)
*G06F 8/61* (2018.01)
*G06F 11/14* (2006.01)
*G06F 21/60* (2013.01)

(56) References Cited

U.S. PATENT DOCUMENTS

| | | | |
|---|---|---|---|
| 9,075,693 B2* | 7/2015 | Sporkert | G06F 8/658 |
| 9,164,757 B2 | 10/2015 | Han | |
| 9,454,436 B2 | 9/2016 | Kim | |
| 10,101,990 B2* | 10/2018 | O'Connor | G06F 11/1433 |
| 2003/0220944 A1* | 11/2003 | Lyman Schottland | G06F 8/658 |
| 2004/0034849 A1* | 2/2004 | Cohen | G06F 8/63 717/120 |
| 2007/0006208 A1* | 1/2007 | Nguyen | G06F 11/1433 717/168 |
| 2007/0208786 A1* | 9/2007 | Kim | G06F 8/658 |
| 2008/0098099 A1* | 4/2008 | Khasnis | G06F 8/61 709/222 |
| 2008/0163192 A1* | 7/2008 | Jha | G06F 8/65 717/173 |
| 2009/0252325 A1* | 10/2009 | Reus | H04L 9/0891 380/255 |
| 2011/0173604 A1 | 7/2011 | Nakamura | |
| 2012/0023489 A1* | 1/2012 | Motta | G06F 8/65 717/170 |
| 2014/0173579 A1* | 6/2014 | McDonald | G06F 8/65 717/170 |
| 2016/0191623 A1* | 6/2016 | Vasudevan | G06F 16/951 709/201 |
| 2016/0291967 A1 | 10/2016 | Badri | |
| 2017/0046152 A1 | 2/2017 | Shih | |
| 2017/0345082 A1* | 11/2017 | Hoxworth | G06F 9/4411 |
| 2019/0034193 A1* | 1/2019 | Fox | G06F 9/4401 |

OTHER PUBLICATIONS

Akshay Bhat; "Software/Firmware Update Design Considerations"; Mar. 30, 2017; https://www.timesys.com/security/software-firmware-update-design-considerations/; 5 pages.

"Managing Firmware Upgrades", https://documentation.meraki.com/zGeneral_Administration/Firmware_Upgrades/Managing_Firmware_Upgrades, 2 pages.

* cited by examiner

OPERATIONAL FILE MANAGEMENT AND STORAGE

BACKGROUND

The present invention relates to the management of a computing device, and more specifically to the management and storage of update operational files for the computing device. In the world today, there are billions of computing devices ranging from computers, laptops, smartphones, routers, and personal computing devices. The expanding practice of incorporating electronic components, such as smart electronic components, into every day devices such as refrigerators, irrigation system controllers, and home security systems reflects a trend wherein the number of computing devices is set to expand at an even more impressive rate. Each of these computing devices are regulated by operational files that instruct the computing device how to operate.

SUMMARY

According to an embodiment of the present invention, a computer-implemented method is described. According to the method, an update package that includes update operational files is received at a computing device. At least one update operational file is to replace a corresponding original operational file for the computing device. It is determined which of the original operational files are to be replaced with corresponding update operational files. A delta file indicating which of the original operational files are to be replaced with corresponding update operational files is stored at the computing device and the update package is installed at the computing device.

The present specification also describes a computing device. An installer of the computing device installs an update package that includes update operational files. At least one update operational file is to replace an original operational file for the at least one operational component. An evaluator of the computing device determines which of the original operational files were replaced with a corresponding update operational file. A storage device maintains a delta file indicating the original operational files that were replaced with corresponding update operational files.

The present specification also describes a computer program product. The computer program product includes a computer readable storage medium having program instructions embodied therewith. The program instructions are executable by a processor to cause the processor to receive, at a computing device, an update package that includes update operational files. At least one update operational file is to replace an original operational file for the computing device. The program instructions are also executable by the processor to cause the processor to 1) determine which of the original operational files are to be replaced with a corresponding update operational file, and 2) store, at the computing device, a delta file indicating the original operational files that are to be replaced with corresponding update operational files, and 3) install the update package at the computing device.

DETAILED DESCRIPTION

Figure 1:
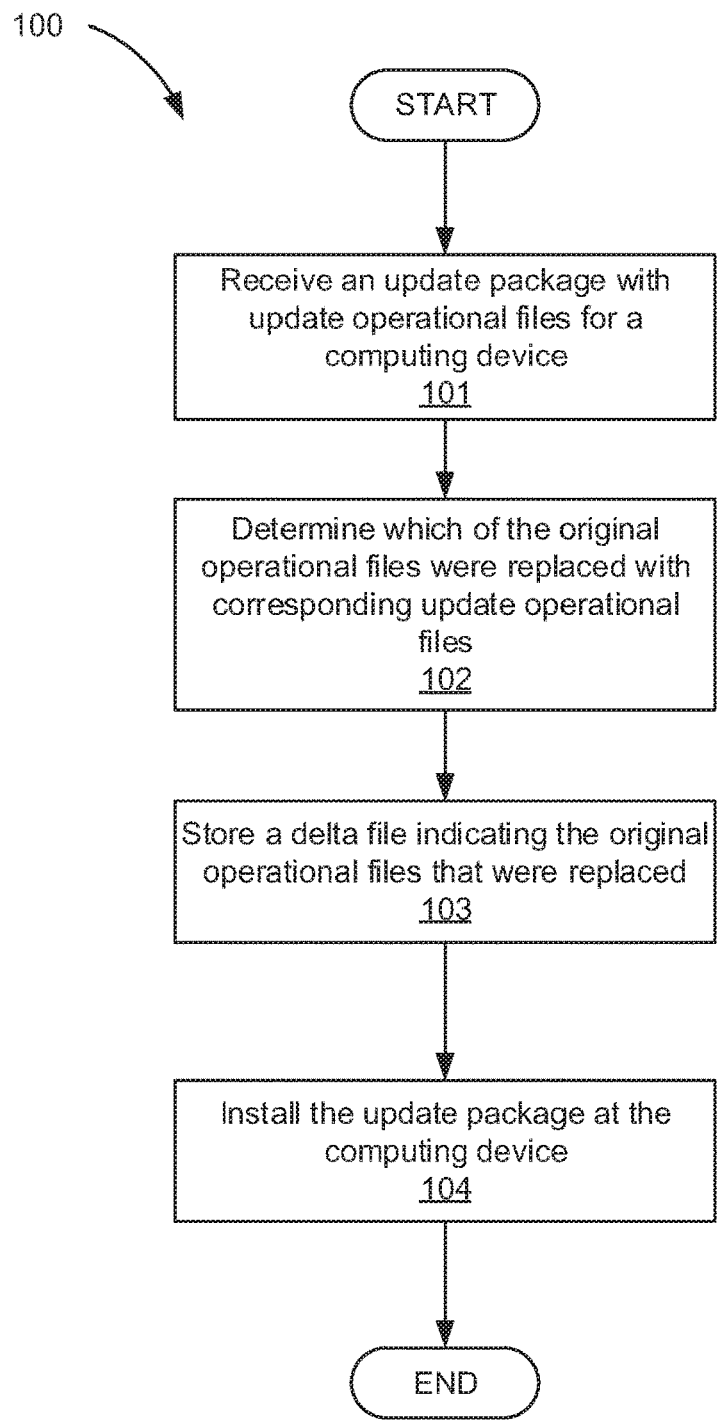
FIG. 1 depicts a flowchart of a method for operational file rnanagement and storage, according to an example of the principles described herein.

The present invention may be a system, a method, and/or a computer program product any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may in fact be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In the world today, there are billions of devices. Operational files are used by the devices to control the operation of the computing device. Over time, a device supporter may develop new instructions or operational files to improve the operation of the computing device or to fix issues with existing operation of the operational files. One problem that device supporters is how to manage the upgrade of these operational files on so many devices, whether the updates be minor security patches or major upgrades. Another problem device supporters face is how to roll back to an older version of the operational files in the event that the updated operational file causes issues.

There are various approaches used by device supporters, each with their drawbacks. For example, a device supporter may provide an incremental update package that contains just those files that have changed. This ensures that the update package remains small. However, this approach has various drawbacks. For example, this results in many different update packages, all of which need to be managed and maintained by the device supporters. Moreover, it is difficult to maintain a list on the device of 1) the update packages that have already been applied and 2) the update packages that still need to be applied. Moreover, these update packages must be applied in a set order and it is difficult to rollback if the updates prove to cause issues.

In another approach, the device supporter can provide a full update package that contains a complete copy of all of the files, whether such files are updated by the update package or not. When using a "full" update package, a computing device can easily upgrade from one arbitrary version to another without any concern, as the entire update package is complete. Housing this approach, a computing device has to store the full update package in case a user wants to downgrade to prior versions. This can consume a lot of disk space, or in some cases can require the storage device on the computing device to be split into two separate partitions, dramatically reducing the amount of storage available for day-to-day use.

Accordingly, the present specification describes methods and systems for storing and managing these operational files. Specifically, the present specification describes an approach where full updates are provided by a device supporter, but just those files of the computing device that are changed are stored on the device itself for rollback purposes. That is, when an update package is received, the computing device generates a delta file that indicates differences between original operational files and update operational files of the update package. In a general sense, the following operations are completed during an operational file upgrade. First, an update package is provided which includes update operational files. A computing device then 1) determines those files that would be changed via the update package, and 2) installs all the operational files. A delta file that indicates those files that were changed is stored on the computing device for use in later rollback.

In one specific example, the production of a delta file includes 1) generating a file list of the current and new files and 2) producing a cryptographically sound checksum for each of the pairs. If the cryptographic sum for an operational file in the original operational package matches the cryptographic sum for the corresponding operational file in the update package, the file is not stored as part of the delta file. Metadata about the updates that are performed is stored on the computing device such that in the event of a rollback, the order in which update packages should be rolled back is known. That is, if the administrator or other user decides to roll back to a prior version of the operational files, the original files, as indicated in the delta file and metadata, are used to replace the updated files on the computing device.

The method, computing device, and computer program product of the present specification provide a number of benefits. For example, the device supporter needs to only maintain a single update package per update. That is, there is no need for multiple incremental update packages. Also, storage space on the computing device is saved. That is, the consumer is able to perform an operational file rollback without sacrificing a large portion of its storage. Still further, the consumer can execute a rollback by relying on a single version of the update package to upgrade to/from arbitrary versions.

As used in the present specification and in the appended claims, the term "operational files" refers to a set of files that control how the computing device operates. Some of the operation files are used to interface with the computing device operational, and other of the operational files handle the processing by the computing device itself.

Further, as used in the present specification and in the appended claims, the term "device supporter" refers to an entity that provides a software or hardware support for a computing device. For example, a supporter may be an application developer, a hardware component provider, etc.

Even further, as used in the present specification and in the appended claims, the term "a number of" or similar language is meant to be understood broadly as any positive number including 1 to infinity.

Turning now to the figures, FIG. 1 depicts a flowchart of a method (100) for operational file management and storage, according to an example of the principles described herein. According to the method (100), an update package is received (block 101). The update package includes a set of operational files for a computing device to be updated. As noted above, the operational files determine how the computing device is controlled and/or operated and may include hardware based files and other files. For example, on a mobile device, some of the files handle the interface with the mobile device hardware. That is, as described above, a computing device is composed of several hardware components, each performing different functions to allow the computing device to operate. For example, a cellular phone may include a display device. A display driver may determine how the display is to be operated. For example, such a driver may determine how to adjust the display based on reduced levels of battery of the computing device. As another example, a computing device such as a computer may include an input/output port. An operational file for this input/output port may include instructions on the detection of various devices plugged into the port. Over time and for a variety of reasons, it may be desirable to update the operation of these operational components. For example, new instructions may be developed for an operational component that allow it to operate more efficiently or to increase its functional capability.

Other files of the operational files relate to the applications that have been installed on the mobile. For example, a mobile device may have a variety of capabilities and functionalities such as making a call, executing a particular application, etc. A device supporter may provide a set of operational files s how these different capabilities and functionalities are carried out.

A device supporter can push these new instructions via an update package that includes changes to the operational files used by the computing device to. That is, a computing device may include a number of original operational files that are used to control the operation of the computing device. Each of the different operational files may control a different capability, function, and/or hardware component of the computing device. As a particular capability, function, and/or hardware component is updated, so is the associated operational file. This update is pushed via an update operational file. A collection of update operational files may be referred to as an update package. As described above, the update package may include not only those operational files that are updated, but also all the operational files that are used by the computing device in regard to that particular capability, function, or hardware component. At least one of the update operational files replaces a corresponding original operational file. Thus, in summary, the update package may include a number of update operational files, each update operational file corresponding to an original operational file that is currently being used by the computing device. However, it may be the case that a subset of all the update operational files actually change a corresponding operational file. For example, if a particular function of an application on a mobile device is to be changed, the corresponding update operational file may alter the original operational file that pertains to that function. However, update operational files that pertain to other functions of the application may be replicas of the original operational file. By including all operational files, whether updated or not, in the update package, a device supporter may produce one update package for the application regardless of the original operational files used by a computing device.

The method (100) also includes determining (block 102) which of the original operational files are to be replaced with corresponding update operational files. That is, some files may be updated and others replicated. This determination (block 102) distinguishes between replicated and updated files. Such a process may be performed any number of ways. For example, a cryptographic hash may be used. In some examples, a cryptographic hash may be referred to as a checksum. In this example, a cryptographic hash may be executed on the original operational files and a similar cryptographic hash may be performed on the updated operational files. A difference in the output of such a cryptographic hash determines that the original operational files have been changed by the update package. Those with the same checksum, or cryptographic hash output, are determined to be replicas, i.e., that have not changed the original operational files, and those with different checksums, or cryptographic hash outputs, are determined to be replacements, i.e., that have changed the original operational files.

Accordingly, determining (block 102) which of the original operational files were replaced with corresponding update operational files includes miming a cryptographic hash function on each of the original operational files to generate a first output. A similar function is performed on each of the corresponding update operational files. That is, the same cryptographic hash function is executed on the update operational files to generate a second output. The outputs for each corresponding pair of operational files is compared. That is, the first output is then compared with the second output to determine if there are any differences between the two. For example, the output of the cryptographic hash functions may be a string of alphanumeric characters. If the first output and the second output have different alphanumeric characters then the original and update operational files are determined to be different, i.e., the update operational file had different instructions from the original operational file.

With differences/similarities between each pair of original and update operational files determined, a delta file is stored (block 103) on the computing device. The delta file is a file that 1) indicates those original operational files that were replaced and 2) that stores the original operational files. For example, returning to the example above, if an output of a cryptographic hash function for an original operational file does not match the output of the same cryptographic hash function for the corresponding update operational file, then the original operational file as well as metadata relating to the update is stored (block 103) at the computing device. By comparison, if corresponding cryptographic hash outputs are the same, no entry is made to the delta file. Accordingly, just those original operational files that are altered are indicated in the delta file. Returning to the example above, the delta file 1) indicates just those original operational files that have different cryptographic hash outputs relative to the cryptographic hash output of a corresponding, or paired, update operational file and 2) stores the files that have been changed.

The update package is then installed (block 104) at the computing device. That is, a processor of the computing device puts the update package into operation. Installation of the update package refers to an operation wherein the operational files that make up the update package are made ready for execution by, and at, the computing device. Installing (block 104) the update package may include replacing at least some of the original operational files and replicating other of the original operational files. That is, the update package may include operational files that correspond to original operational files. In some cases, the update operational file may alter the corresponding original operational file, in other cases, the update operational file may not alter, but rather may be a replicate of, the original operational file. Accordingly, installing (block 104) the update package includes replacing original operational files with update operational files and in some cases by replacing them updating the contents of those files.

Note that while a particular order is described herein, where a difference determined, a delta file indicating those differences is stored at the computing device, and then the update package is installed, a different order may exist. For example, the differences between an update package to be installed and the original operational files may be determined and then just those files that are changed would be installed and those update files that do not alter the original operational files would not be installed. That is, when one of the original operational files and the corresponding update operational file are the same, this update operational file is removed from the update package. Doing an installation in this fashion increases computer functionality by enhancing the efficiency of update installation. That is, rather than installing each update regardless of whether it alters the original operational file, may consume additional time and bandwidth of the computing device.

Accordingly, the present method (100) calculates the difference between an update package and an original operational package based on the files that are changed, or added to the system rather than performing a byte-by-byte comparison of the entire update. Such a method provides a variety of improvements to computer functionality. For example, as just the files that were changed are stored, and not the entire update package, it reduces the storage space used on the computing device. Moreover, such a method (100) increases the speed of a rollback. That is, to revert to a previous version of the operational files, rather than having to replace each of the update operational files with the corresponding original operational files, a subset therein, i.e., just those with differences, are replaced. In addition to increasing the rollback speed, the efficiency of rollback is also enhanced as there are less reads/writes of files that do not change. Doing so may improve the life of certain components as the repeated reading/writing of files may alter the performance of these components. Accordingly, by reducing the amounts of reads/writes, i.e., by only reading/writing when a change is determined, the performance of the components is enhanced, and in some examples, the life of the component is enhanced.

Figure 2:
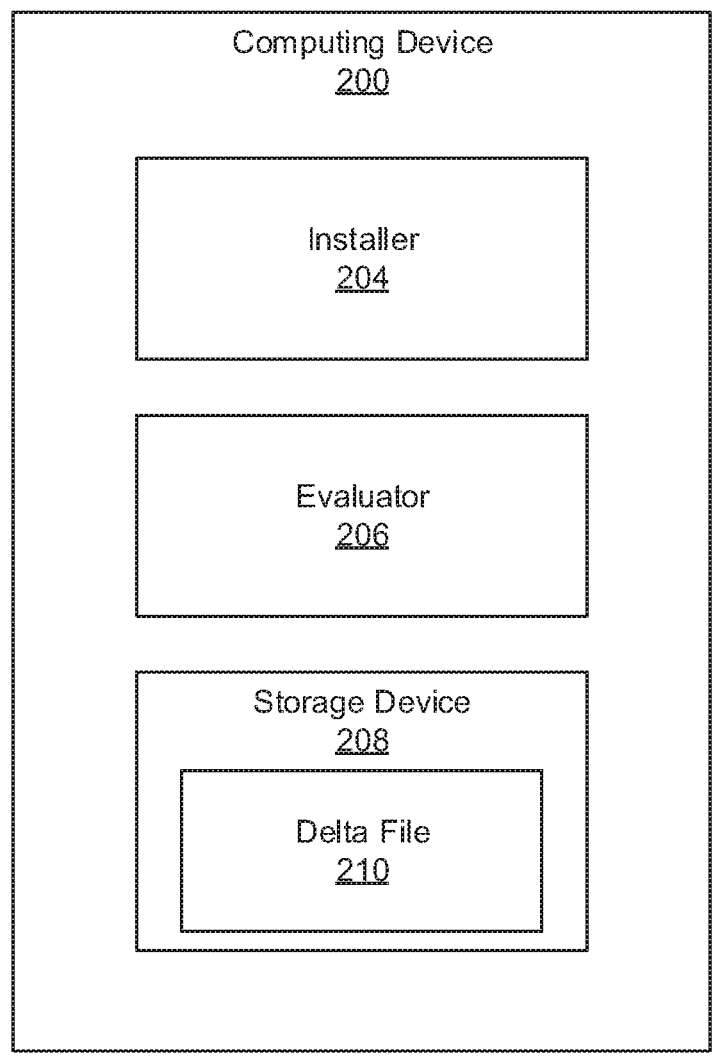
FIG. 2 depicts a computing device for operational file management and storage, according to an example of principles described herein.

FIG. 2 depicts a computing device (200) for operational file management and storage, according to an example of principles described herein. To achieve its desired functionality, the computing device (00) includes various components. Each component may include a combination of hardware and program instructions to perform a designated function. The components may be hardware. For example, the components may be implemented in the form of electronic circuitry (e.g., hardware). Each of the components may include a processor to execute the designated function of the component. Each of the components may include its own processor, but one processor may be used by all the components. For example, each of the components may include a processor and memory. Alternatively, one processor may execute the designated function of each of the components.

In general, the computing device (200) may be any device that includes a processor and other hardware components. For example, the computing device (200) may be a desktop computer, a laptop computer, a server, a printer, a mobile phone, a router, or any other such device that includes processors and hardware components. Other examples of computing devices (200) include smart home devices such as home alarm systems, irrigation systems, home entertainment equipment, and other such equipment. As can be imagined the list of computing devices (200) may encompass all computing devices with hardware components that are controlled via operational files, and the present specification relates to any such computing device (200).

Even more numerous than the types of computing devices (200) are the hardware components included in such devices. For example, a computing device (200) may include any number of processors and other hardware components that rely on program instructions to run. As a particular example, a computing system may include memory, network interface cards, graphics cards, input devices, output devices, processing chips, antennas, and various other hardware components. While specific reference is made to particular types of hardware components, the present specification may apply to any variety of hardware component of any variety of computing device (200).

The computing device (200) includes an installer (204) that installs an update package, or a portion thereof. As described an update package, as received from a device supporter, includes up-to-date operational files to provide a particular capability, functionality, or instruction to run a particular hardware component. At least one of the update operational files is to replace an original operational file meaning that the update operational file is different from the original operational file. An example of such a difference is that an update operational file includes instructions that provide a new functionality to a hardware component. Another example of such a difference is that an update operational file includes instructions to fix a bug present in an older version of the operational file.

Installing the update package means that the operational files, or a portion thereof, are made ready for execution by the computing device (200) and may include copying the files to a location where they are accessed and executed by a processor of the computing device (200). In some examples, the installer (204) installs each of the update operational files in the update package. In this example, the evaluator (206) determines differences and stores just those operational files that were updated during installation of the update package. Doing so is advantageous in that this method is thorough and ensures all the correct files are being used.

In another example, the installer (204) installs just those update operational files that differ from a corresponding original operational file. In this example, the evaluator (206) determines differences between the update package and the operational files already on the computing device (200) and removes from the update package those that are the same. Doing so improves computer functionality by increasing bandwidth during update installation. That is, an update package may be quite large, in some examples being gigabyte, or multiple gigabytes in size. The time and resources to install such a package may drain battery and consume valuable bandwidth for an extended period of time such that it impedes other computer functions. Accordingly, by installing just those operational files that alter corresponding operational files, computing efficiency is promoted as unaltered files are not needlessly installed.

The installer (204) is also used during an operational file rollback. That is, at any point in time a device supporter or a user of the computing device (200) may want to rollback to a previous version of the operational files. For example, a user may determine that the update operational files conflict with other operational files in a way that the original operational files did not. Accordingly, the user may desire to roll back to the original operational files. In this example, the installer (204), during the operational file rollback identifies from the delta file (210), the original operational files that were replaced by the update and replaces the corresponding update operational files with the original operational files that are stored in the delta file (210).

Doing so improves computer functionality by increasing bandwidth during rollback. That is, an update package may be quite large, in some examples being a gigabyte or multiple gigabytes in size. The time and resources to rollback such a package may drain battery and consume valuable bandwidth for an extended period of time such that it impedes other computer functions. Accordingly, by replacing just those operational files that were altered, computing efficiency is promoted as unaltered files are not needlessly replaced.

The computing device (200) also includes an evaluator (206) to determine which of the original operational files were, or are to be, replaced with a corresponding update operational file. That is, the evaluator (206) may be able to determine whether an update operational file of an update package alters, or merely replicates, the corresponding original operational file. That is, the evaluator (206) determines which of the original operational files were replaced with an update operational file by determining differences in operational files after the update package installation. In one specific example, the evaluator (206) determines this via a number of sub-components. Specifically, the evaluator (206) may include a component that performs a cryptographic hash function on corresponding pairs of update and original operational files. An output of this component is a string of alphanumeric characters where a difference in the string indicates a difference in compared files. Accordingly, another component of the evaluator (206) compares the string outputs to determine if there is a difference. While specific reference is made to an evaluator (206) that relies on cryptographic hash functions and comparison of the outputs therefrom, other types of evaluators (206) may be used in accordance with the principles described herein.

The computing device (200) also includes a storage device (208) to maintain a delta file (210). The storage device (208) may be any kind of non-volatile storage such as flash or random-access memory. Other examples of non-volatile storage include read-only memory (ROM), an erasable programmable read-only memory (EPROM or Flash memory), and a static random access memory (SRAM). As described, the delta file (210) indicates, and in some cases includes, the original operational files that were replaced with corresponding update operational files. For example, a hard drive may have an original operational file that allows the processor to operate the hard drive in a particular way. At some point in time, the hard drive producer may push an update to this operation via an update operational file. In this example, the installer (204) installs the update operational file, the evaluator (206) determines that the update operational file is different than the original operational file for the hard drive, and an indication of how the operational files differ, and in some cases the original operational file itself, are stored in the storage device (208), in the case where the installer (204) installs the entire update package, the delta file (210) in the storage device (2080 indicates just those update operational files that, during installation, replace a corresponding original operational file. By comparison, in the case where the installer (204) installs just those files that would be replaced, the delta file (210) indicates all the update operational files in the revised update package. In either case, the storage device (208) stores less than the entire update package either by 1) reducing the size of the original update package by removing from it those files that would remain unchanged following installation or 2) storing just a subset of the original update package, the subset being those update operational files that change the corresponding original operational files.

In some examples, the storage device (208) may include multiple delta files (210) each associated with an update. For example, a hardware component may be updated from a version 1 to a version 2. A delta file (210) may be instantiated that corresponds to the version 1-to-version 2 update. Subsequently, the same hardware component may be updated from version 2 to version 3. A second delta file (210) may exist that corresponds to the version 2-to-version 3 update. Accordingly, each delta file (210) may be chronologically indexed based on when the update was performed and/or when the update was installed, in addition to storing the operational files that were replaced, the delta files (210) may also include metadata such as a version number associated with the delta file (210) and a release date of the update. Such information is useful when rolling back. For example, based on the metadata and the chronological index, the computing device (200) during an operational file rollback, may identify which of the delta files (210) corresponds to the immediately preceding operational file set. That is, metadata may allow the computing device to identify the correct operational file to revert to. Such indexing is particularly relevant when rolling back to non-sequential or non-chronological operational file packages as described in connection with FIG. 3.

In summary, the computing device (200) of the present specification with delta files (210) that indicate, and store, just files changed, promotes computing economy by reducing the memory load of operational file storage. This is particularly relevant when a storage device (208) includes multiple sets of operational files for each of the numerous capabilities/functionalities/hardware components on a computing device (200). That is, rather than storing multiple complete update packages for multiple capabilities/functionalities/hardware components, the computing device (200) may hold delta files, which are significantly smaller than the entire update package to which they are associated.

Figure 3:
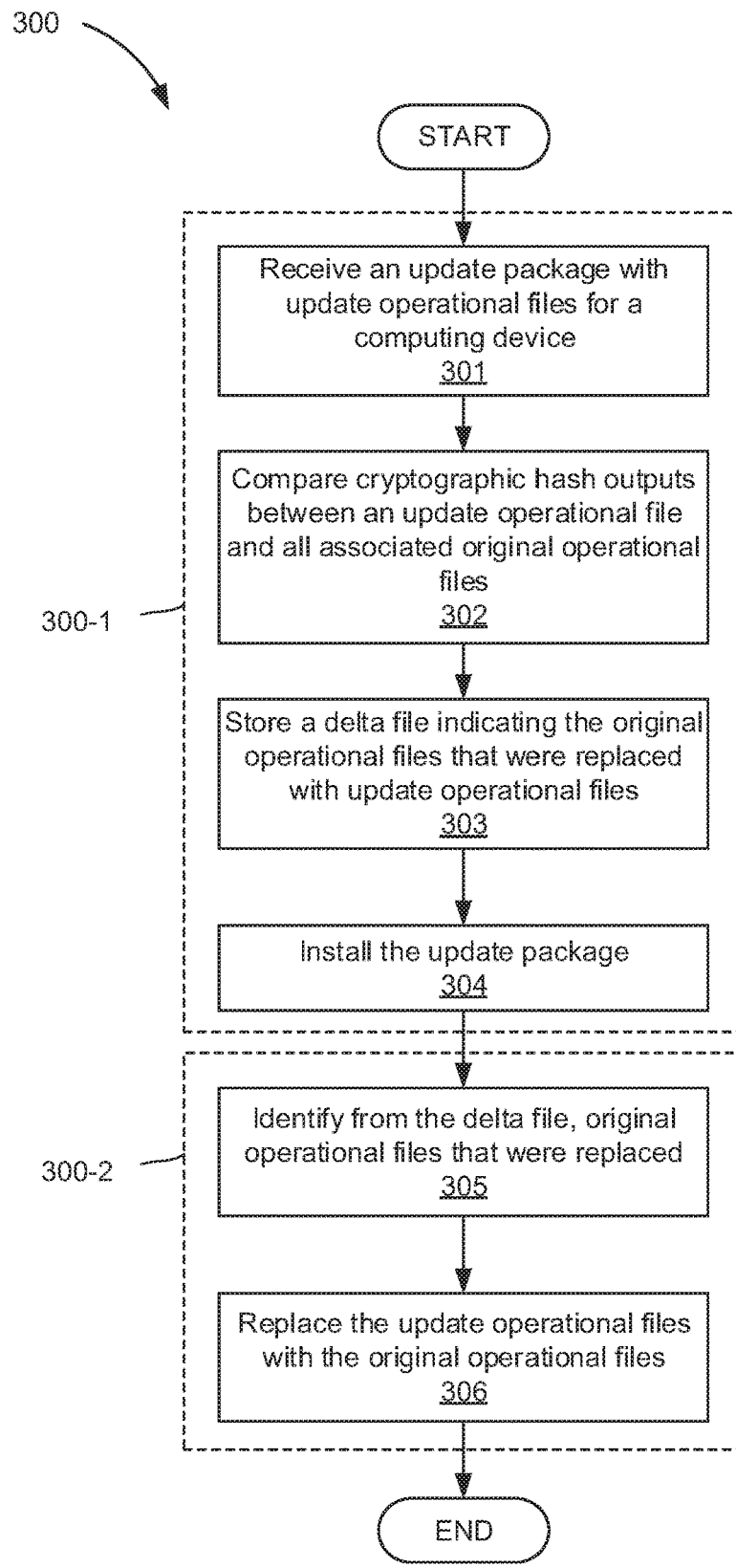
FIG. 3 depicts a flowchart of a method for operational file management and storage, according to another example of principles described herein.

FIG. 3 depicts a flowchart of a method (300) for operational file management and storage, according to another example of principles described herein. FIG. 3 depicts two stages of operational file management, an installation stage (300-1) and a rollback stage (300-2). According to the method (300), an update package is received (block 301) at a computing device (FIG. 2, 200). As described above, an evaluator (FIG. 2, 206) evaluates what update operational files differ from the original operational files. This may be done by performing a cryptographic hash of each of the update operational file and the original operational file and comparing (block 302) the outputs therefrom. That is, the same cryptographic hash function is executed on the update operational files and the original operational files. The outputs for each corresponding pair of operational files is compared. If the first output and the second output have different alphanumeric characters then the original and update operational files are determined to be different, i.e., the update operational file had different instructions from the original operational file. When an update operational file is determined to be different from its original operational file, an indication, and the original operational file, is stored (block 303) in a delta file. This may be performed as described above in connection with FIG. 1. The update package may then be installed (block 403). Installing (block 304) the update package may include installing each update operational file, and later storing just the original operational files that changed, or may include installing just those update operational files that would change a corresponding original operational file and then storing each of the operational files of the revised update package.

The delta files (FIG. 2, 210) are used in file rollback as well. For example, a device supporter or a user of the computing device (FIG. 2, 200) may want to rollback to a previous version of the operational files. In this example, the method (300) includes identifying (block 305) from the delta file (FIG. 2, 210), the original operational files that were replaced and altered by the corresponding update operational file and replacing (block 306) the corresponding update operational files with the original operational files as stored in the delta file (FIG. 2, 210). Doing so improves computer functionality by increasing bandwidth during rollback and by reducing the memory capacity needed to store the data from which a rollback is initiated.

In some cases, a user may desire to rollback to non-sequential operational file sets. For example, a user may currently have installed a version 4 of an operational file set and may want to roll back to a version 2 of the operational file set. In this example, the storage device (FIG. 2, 208) by storing delta files (FIG. 2, 210) associated with each update package allows for such a multi-set rollback. In this example, such a rollback would be incremental. For example, a hardware component would first be rolled back from a version 4 to a version 3. The hardware component would then be rolled back from the version 3 to the version 2.

In some examples, the rollback of the operational file sets may be triggered via user input. That is a user, such as a user of the computing device (FIG. 2, 200) or a producer of the hardware component may determine that a rollback is desired. In other examples, the rollback may be automated. That is, a machine-learning device may detect that a particular operational file set associated with an update package is resulting in certain inefficiencies that were not detected when the original operational file set was run. Accordingly, in this example, the rollback may be self-initiated by the computing device (FIG. 2, 200).

Figure 4:
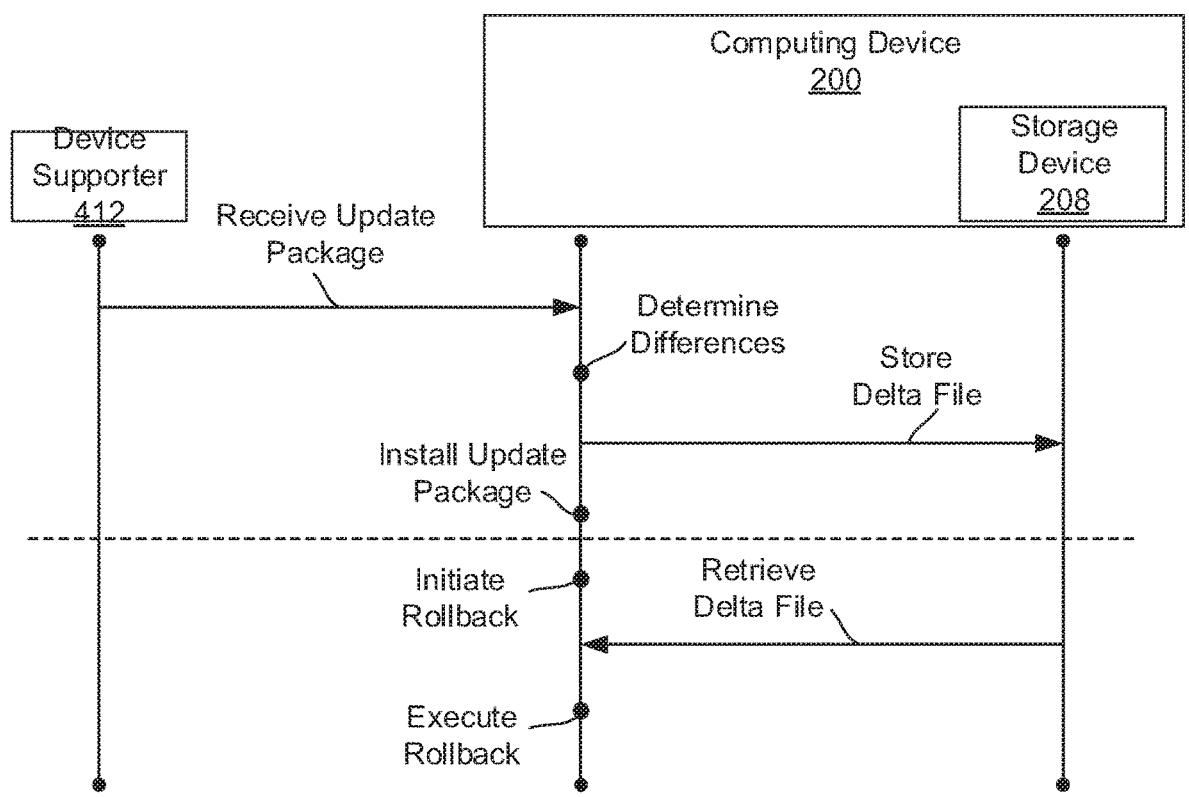
FIG. 4 depicts a thread diagram of operational file management and storage, according to an example of the principles described herein.

FIG. 4 depicts a thread diagram of operational file management and storage, according to an example of the principles described herein. In this example, a device supporter (412), which may support and/or manufacture a particular hardware component or define the operating capability of the hardware component of a computing device (200) provides an update package to the computing device (200). That is, the computing device (200) receives the update package. An evaluator (FIG. 2, 206) of the computing device (200) can then determine the differences between the update package and the operational files that are to be replaced. The differences are then stored in a delta file (FIG. 2, 208) and moved to a storage device (FIG. 2, 208) for long-term storage and the computing device (200) installs the update package. In this example, the entire install package may be very large, for example 1 gigabyte. In the example provided, the delta file (FIG. 2, 210) may be an order of magnitude smaller than the entire update package. For example, the delta file (FIG. 2, 210) may be around 100 megabytes, thus resulting in a significant freeing up of the storage device (208).

At a subsequent point in time, a rollback may be initiated at the computing device (200) either by a user of the computing device (200), the device supporter (412), or automatically at the computing device (200). Responsive to such an initiation, the delta file (FIG. 2, 210) is retrieved and the rollback executed. That is, the update operational files that were replaced during the initial upgrade are themselves replaced with the original operational files to place the computing device (200) in a previous computing state.

Figure 5:
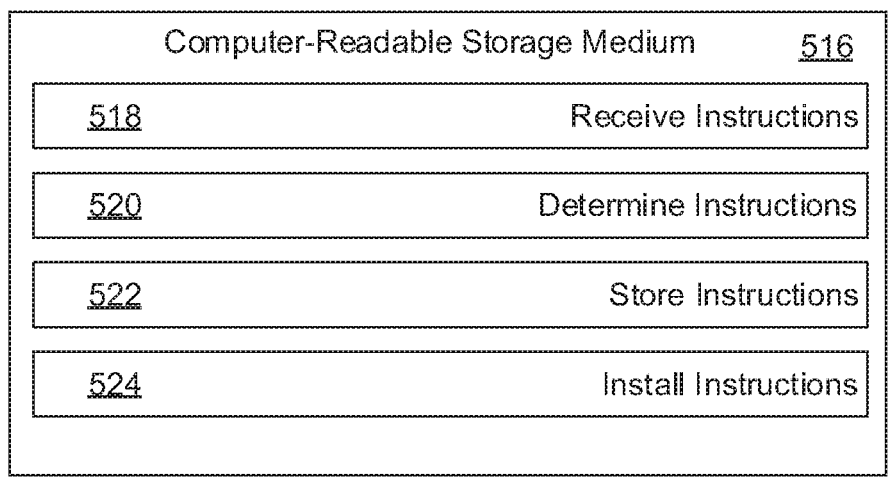
FIG. 5 depicts a computer readable storage medium for operational file management and storage, according to an example of principles described herein.

FIG. 5 depicts a computer program product (514) including a computer readable storage medium (516) for operational file management and storage, according to an example of principles described herein. To achieve its desired functionality, a computing system includes various hardware components. Specifically, a computing system includes a processor and a computer-readable storage medium (514). The computer-readable storage medium (516) is communicatively coupled to the processor. The computer-readable storage medium (516) includes a number of instructions (518, 520, 522, 524) for performing a designated function. The computer-readable storage medium (516) causes the processor to execute the designated function of the instructions (518, 520, 522, 524).

Referring to FIG. 5, receive instructions (518), when executed by the processor, cause the processor to receive, at a computing device (FIG. 2, 200) an update package that includes update operational files, at least one of which is to replace an original operational file for the computing device (FIG. 2, 200). Determine instructions (520), when executed by the processor, may cause the processor to, determine which of the original operational files are to be replaced with a corresponding update operational file. Store instructions (524), when executed by the processor, may cause the processor to store, at the computing device (FIG. 2, 200), a delta file (FIG. 2, 210) indicating the original operational files that are to be replaced with corresponding update operational files, install instructions (520), when executed by the processor, may cause the processor to install the update package at the computing device (FIG. 2, 200).

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general purpose computer, special purpose computer, or other programmable data processing apparatus to produce a machine, such that the computer usable program code, when executed via, for example, the processor of the computing system or other programmable data processing apparatus, implement the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   receiving, at a computing device, an update package comprising update operational files, at least one of the update operational files to replace a corresponding original operational file on the computing device;
   determining which of the original operational files on the computing device are to be replaced with one of the update operational files;
   removing, from the update package, update operational files that are the same as a corresponding original operational file already on the computing device to produce a reduced update package;
   storing, at the computing device, a delta file indicating just the original operational files already on the computing device that are to be replaced with a corresponding update operational file from the update package; and
   after removing from the update package the update operational files that are the same as the corresponding original file already on the computing device, installing the reduced update package at the computing device.

2. The computer-implemented method of claim 1, further comprising, during an operational file rollback:
   identifying from the delta file, original operational files that were replaced with the update operational files; and
   replacing the update operational files with corresponding original operational files.

3. The computer-implemented method of claim 2, further comprising, during the operational file rollback, rolling back to non-chronological operational files by iteratively rolling back changes between chronological operational files.

4. The computer-implemented method of claim 2, further comprising receiving user input to initiate the operational file rollback.

5. The computer-implemented method of claim 1, wherein determining which of the original operational files are to be replaced with the corresponding update operational files comprises performing a cryptographic hash between each of the original operational files and the corresponding update operational files.

6. The computer-implemented method of claim 5, wherein the delta file indicates just those original operational files having different cryptographic hashes as the corresponding update operational files.

7. A computing device comprising:
   an installer to install an update package that comprises update operational files, at least one update operational file to replace an original operational file for the computing device;
   an evaluator to:
      determine which of the original operational files are to be replaced with a corresponding update operational file; and
      remove from the update package update operational files which replicate an original operational file as determined by a checksum comparison; and
   a storage device to:
      maintain a delta file indicating just the original operational files that were replaced with corresponding update operational files;
      store metadata so that an order in which update packages should be rolled back is known; and
      store a subset of the update package.

8. The computing device of claim 7, wherein the installer installs the update package following a determination of which of the original operational files are to be replaced and storage of the delta file.

9. The computing device of claim 7, wherein the subset is those update operational files that change a corresponding original operational file.

10. The computing device of claim 7, wherein the installer installs just those update operational files that differ from a corresponding original operational file.

11. The computing device of claim 7, wherein the installer installs each update operational file.

12. The computing device of claim 7, wherein the storage device maintains multiple delta files, each delta file associated with an update package.

13. The computing device of claim 12, wherein the multiple delta files are chronologically indexed.

14. The computing device of claim 7, wherein the installer, during an operational file rollback:
   identifies from the delta file, original operational files that were replaced with a corresponding update operational file; and
   replaces the update operational files with a corresponding original operational file.

15. The computing device of claim 7, wherein the metadata comprises data by which a delta file can be identified.

16. The computing device of claim 15, wherein the metadata comprises a version number of the update package and a release date of the update package.

17. A computer program product, the computer program product comprising a computer readable storage medium having program instructions embodied therewith, the program instructions executable by a processor to cause the processor to:
- receive, at a computing device, an update package comprising update operational files;
- distinguish between the original operational files which are to be updated with a corresponding update operational file and the original operation files which are replicated by an update operational file; and
- store, at the computing device, a delta file indicating just the original operational files that are to be replaced with corresponding update operational files;
- remove from the update package update operational files which replicate an original operational file as determined by a checksum comparison;
- install the update package at the computing device;
- store a subset of the update package, the subset being those update operational files that change a corresponding original operational file; and
- store, at the computing device, metadata so that an order in which update packages should be rolled back is known.

18. The computer program product of claim 17, further comprising program instructions executable by the processor to cause the processor to, during a machine-readable instruction rollback:
- identify from the delta file, original operational files that were replaced with a corresponding update operational file; and
- replace the update operational files with a corresponding original operational file.

19. The computer program product of claim 18, further comprising program instructions executable by the processor to cause the processor to, during the operational file rollback, roll back to non-chronological operational files by iteratively rolling back changes between chronological operational files.

20. The computer program product of claim 17, wherein determining which of the original operational files were replaced with an update operational file comprises determining changes in operational files by the update package installation.

* * * * *